United States Patent [19]

Rusek, Jr.

[11] Patent Number: 5,330,816
[45] Date of Patent: Jul. 19, 1994

[54] HIGH R SUPER INSULATION PANEL
[75] Inventor: Stanley J. Rusek, Jr., Newark, Ohio
[73] Assignee: Owens-Corning Fiberglas Technology Inc., Summit, Ill.
[21] Appl. No.: 993,883
[22] Filed: Dec. 23, 1992
[51] Int. Cl.⁵ ............................................. B32B 1/04
[52] U.S. Cl. .................................... 428/69; 428/288; 428/297; 428/302; 428/902; 428/903
[58] Field of Search .................. 428/69, 285, 288, 297, 428/248, 302, 406, 902, 903, 920; 156/62.8; 264/136, 137; 65/4.4

[56] References Cited

U.S. PATENT DOCUMENTS

| | | |
|---|---|---|
| 2,745,173 | 5/1956 | Janos . |
| 2,768,046 | 10/1956 | Evans . |
| 2,779,066 | 1/1957 | Gaugler et al. . |
| 2,817,124 | 12/1957 | Dybvig . |
| 2,863,179 | 12/1958 | Gaugler . |
| 2,989,156 | 6/1961 | Brooks et al. . |
| 3,108,706 | 10/1963 | Matsch et al. . |
| 3,139,206 | 6/1964 | Matsch . |
| 3,151,364 | 10/1964 | Glaser et al. . |
| 3,179,549 | 4/1965 | Strong et al. . |
| 3,199,715 | 10/1965 | Paivanas . |
| 3,264,165 | 8/1966 | Stickel . |
| 3,514,006 | 5/1970 | Molnar . |
| 4,000,246 | 12/1976 | Walles ................................ 423/230 |
| 4,444,821 | 4/1984 | Young et al. . |
| 4,486,482 | 12/1984 | Kobayashi et al. ...................... 428/69 |
| 4,514,450 | 4/1985 | Nowobilski et al. .................. 428/120 |
| 4,529,638 | 7/1985 | Yamamoto et al. ..................... 428/69 |
| 4,537,820 | 8/1985 | Nowobilski et al. .................. 428/285 |
| 4,662,521 | 5/1987 | Moretti ............................. 206/484.2 |
| 4,668,551 | 5/1987 | Kawasaki et al. ..................... 428/69 |
| 4,668,555 | 5/1987 | Uekado et al. ....................... 428/69 |
| 4,681,788 | 7/1987 | Barito et al. ........................ 428/68 |
| 4,683,702 | 8/1987 | Vis .................................... 53/433 |
| 4,702,963 | 10/1987 | Phillips et al. ...................... 428/426 |
| 4,726,974 | 2/1988 | Nowobilski et al. ................... 428/69 |
| 4,906,502 | 3/1990 | Rudy .................................. 428/69 |
| 5,018,328 | 5/1991 | Cur et al. ........................... 50/406 |
| 5,032,439 | 7/1991 | Glicksman et al. .................... 428/69 |
| 5,090,981 | 2/1992 | Rusek, Jr. ............................ 65/4.4 |
| 5,094,899 | 3/1992 | Rusek, Jr. ............................ 428/69 |
| 5,107,649 | 4/1992 | Benson et al. ........................ 428/71 |
| 5,157,893 | 10/1992 | Benson et al. ........................ 52/792 |
| 5,175,975 | 1/1993 | Benson et al. ........................ 428/172 |

OTHER PUBLICATIONS

"Analysis of the local thermal conductivity in inhomogeneous glass fiber insulations", by H. Reiss et al., Presented at the Ninth European Thermophysical Properties Conference, Sep. 17-21, 1984.
"Fiber Glass for Use in Evacuated Thermal Insulations", by R. M. Fay, Journal of Thermal Insulation, vol. 14, Jan. 1991.
"Flat Panel Vacuum Thermal Insulation", H. M. Strong et al, Journal Of Applied Physics, vol. 31, #1, Jan. 1960.

Primary Examiner—B. Hamilton Hess
Assistant Examiner—William A. Krynski
Attorney, Agent, or Firm—Ted C. Gillespie; Charles H. Ellerbrock

[57] ABSTRACT

An insulation panel comprises an insulation board of glass fibers and a partially evacuated gas-tight envelope encapsulating the board, where, prior to the evacuation of the envelope, the board has been subjected to a heat setting process in which the board is raised to a heat setting temperature above the strain temperature of the glass but below the softening temperature of the glass and to a pressure applied by opposed platens followed by a quick release of the board from the platens prior to substantial cooling of the board.

18 Claims, 2 Drawing Sheets

HIGH R SUPER INSULATION PANEL

TECHNICAL FIELD

This invention pertains to insulation products suitable for insulating appliances, transportation vehicles, and industrial equipment. More particularly, this invention relates to manufacturing insulation products having a very high resistance to thermal conductivity in order to provide good insulating qualities with a minimum insulation product.

BACKGROUND ART

Traditional insulation materials for appliances, transportation vehicles and industrial equipment include mineral fibers and foamed materials. For the insulation of refrigerators, freezers, or water heaters, mineral fiber insulation can provide an R-value of about four R's per inch, where an R-value equals one $HrFt^{2\circ}$ F./Btu. Foamed materials containing chlorinated fluorocarbons in the foam cells can provide an R-value of 8 R's per inch. Due to desires to eliminate the fluorocarbons from the environment, and desires to provide more efficient insulation products to save energy, manufacturers of appliances, transportation equipment and industrial equipment, are seeking more efficient insulation products. One possible solution is to merely increase the thickness of the insulation product, thereby increasing the overall R-value. This is an undesirable solution because it makes the insulated object rather bulky.

In order to provide a very efficient insulation product ("super insulation"), some sophisticated insulation systems have been developed. Some of these systems have been developed for space applications for NASA and other governmental bodies.

One of the known super insulation products is that of finely divided inorganic particulate material compressed into a board-like structure, and encapsulated in order to contain the material. It is known that these products can be compressed into boards having an R-value of 20 R's per inch. The particulate material does a good job of stopping the gas conduction component of thermal heat transfer but does not do a good job of stopping the radiation component of thermal heat transfer. Also, the greater the vacuum (i.e., the lower the gauge pressure) the more the particulate material is compressed, thereby providing more particle-to-particle contact and a better path for solid conduction heat transfer. Thus, an upper limit to R-value is reached dependent on the substantial solid conduction heat transfer of the compacted particulate material. Further increases of vacuum do not improve the R-value of wholly particulate material insulations because of solid conduction. In addition, non-opacified powders are relatively inefficient in blocking the radiative heat transfer.

Another sophisticated super insulation product involves the use of layers of highly reflective material to stop the radiant component of heat transfer. The reflective layers are typically foils, and these must be separated by thermally efficient spacers, such as thin glass fiber mats, or glass beads. The product must be encapsulated and evacuated to prevent gas conduction heat transfer. The drawback with these foil systems is that the foils are difficult to work with, and the product has high material costs. Further, an inherent problem with any evacuated insulation system is that the system must be able to withstand the atmospheric pressure pressing on the sides of the panel. The greater the vacuum, the greater the pressure produced from outside the panel. The thin layers of foil, even though kept separated by spacers, are subject to deformation by the atmospheric pressure. In the event layers of foil touch each other, a path of solid thermal conduction will result, thereby providing a thermal bridge.

Another super insulation product includes a board formed from a predominant amount of mineral fibers and a particulate filler material. This product is encapsulated and evacuated. The mineral fibers provide a good barrier to radiant energy heat transfer, and the particulate material provides a good barrier to heat transfer by gas conduction. The drawback with this product is that the use of such finely divided particulate material creates processing problems.

The use of encapsulated glass fiber insulation boards has been proposed for insulating the walls of appliances. As explained in U.S. Pat. No. 2,745,173 the glass fiber insulation board can be pressed during the application of heat in order to produce a compressed fiberglass board, and to substantially reduce the likelihood of loose glass fibers extending beyond the side wall of the board. It is known that if glass fibers intrude into the joint or seal of the encapsulating envelope, these stray fibers can cause defects in the seal, thereby preventing the development of a good vacuum. The problem with previously known heat setting processes is that the amount of time required to produce the compressed fiber board exceeds commercial practicality. For example, in U.S. Pat. No. 2,745,173 the temperature of the glass fiber board must be reduced to substantially below the strain temperature before the compression of the board is released.

It can be seen that the prior art super insulation products lack many of the desirable features of an ideal product. These features include resistance to compressibility, ease of manufacture, relatively low cost of materials, avoidance of high vacuums, and maintenance of a high R-value during a long life of the product.

Also, there is a need for a suitable super insulation product which is easy to manufacture, and which can be manufactured in a relatively short time.

DISCLOSURE OF THE INVENTION

The present invention is directed to an insulation panel comprising an insulation board and a partially evacuated gas-tight envelope, where the board has been heat set in a process which includes a quick release of the board from the compression apparatus.

According to this invention, there is provided an insulation panel comprising an insulation board of compressed glass fibers and a partially evacuated gas-tight envelope encapsulating the board, where, prior to the evacuation of the envelope, the board has been subjected to a heat setting process in which the glass fiber board is raised to a heat setting temperature above the strain temperature of the glass but below the softening temperature of the glass, and to a pressure applied by opposed platens within the range of from about 10 psi (69 kPa) to about 50 psi (345 kPa) followed by a quick release of the board from the platens prior to substantial cooling of the board.

The resulting heat-set board has the ability to withstand external pressure loading of at least 20 psig (138 kPa) without deflection greater than 15 percent, and preferably up to 35 psig (241 kPa) or more without substantial deflection.

In a specific embodiment of the invention, the heat setting temperature is at least 20° C. above the strain temperature of the glass.

In another embodiment of the invention the heat setting temperature is at least 80 degrees C. below the softening point of the glass.

In yet another embodiment of the invention, the temperature of the board is raised to at least 260 degrees C. prior to the application of pressure by the platens.

In a preferred embodiment of the invention, the edges of the board are treated with an additional application of heat prior to encapsulation.

In a specific embodiment of the invention, the gas-tight envelope, or at least the edges of the gas tight envelope comprise a low conductance metal, such as stainless steel. The low conductance metal, particularly at the edges of the gas tight envelope, prevents a thermal short circuit of heat around the edges of the insulation panel.

In a preferred embodiment of the invention the gas-tight envelope has an absolute internal pressure of less than 20 torr. More preferably, the absolute internal pressure is within the range of from about $10^{-5}$ to about $10^{-1}$ tort. Most preferably, the pressure is about $10^{-3}$ torr.

According to this invention there is also provided a method for making an insulation panel comprising preparing an insulation board of compressed glass fibers by
a. raising the board to a heat setting temperature at least 20 degrees C. above the strain temperature of the glass but at least 80 degrees C. below the softening temperature of the glass,
b. applying pressure within the range of from about 10 psi (69 kPa) to about 50 psi (345 kPa) to the board with opposed platens, and,
c. quickly releasing the board from the platens prior to substantial cooling of the board, encapsulating the board in a gas-tight envelope, and partially evacuating the gas-tight envelope to an absolute internal pressure within the range of from about $10^{-5}$ to about $10^{-5}$ torr.

BEST MODE FOR CARRYING OUT THE INVENTION

The invention will be described in terms of an insulation panel and method for making the insulation panel using glass fibers. It is to be understood that other mineral fibers, such as fibers made from rock, slag, or basalt could be employed in the invention.

Figure 1:
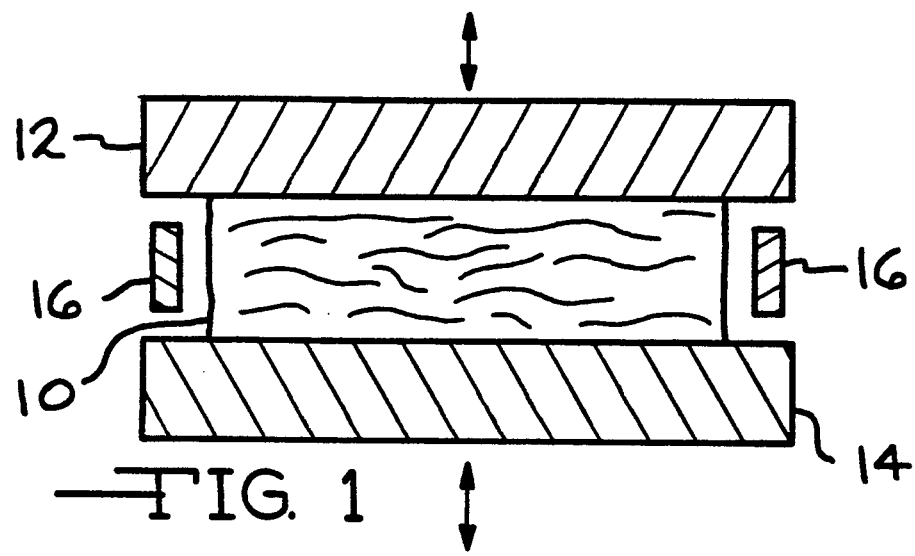
FIG. 1 is a schematic cross-sectional view in elevation of a fiberglass board positioned between upper and lower platens prior to the heat setting process.

Referring to FIG. 1, it can be seen that glass fiber board 10 is positioned between upper platen 12 and lower platen 14. The glass fiber board is preferably made from fibers having a diameter between 1 and 25 microns, and most preferably having a diameter between 3 and 12 microns. Preferably, the fibers are made from a rotary process and have generally uniform fiber diameters, and a minimum of shot. The density of the board, in pounds per cubic foot (pcf) is preferably within the range of from about 6 pcf (96 kg/m$^3$) to about 28 pcf (448 kg/m$^3$).

It is very desirable that the glass fibers are clean and contain no binder, particularly no organic binder, so that under vacuum conditions there is no gaseous formation of an organic material to form gases for thermal conduction within the partially evacuated envelope.

The platens can be any means suitable for applying heat and pressure to the major surfaces of the glass fiber boards. The platens are preferably mounted for movement vertically up and down, and can be adapted with heating means, such as electric resistance heating or hot gas convection heating, not shown. The apparatus is provided with a mechanical stop means, such as stops 16 to positively limit movement of the platens in the vertical direction and thereby define the thickness of the fiberglass board during the heat setting process.

Figure 2:
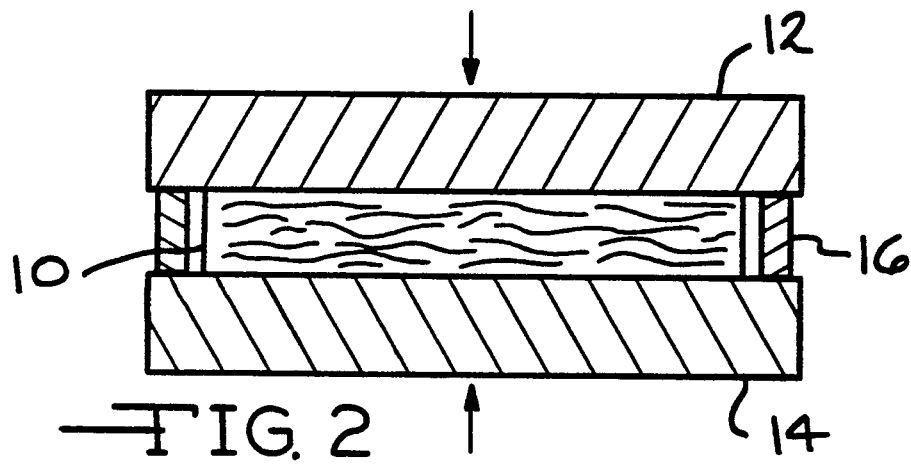
FIG. 2 is a schematic cross-sectional view in elevation of the fiberglass board and platens during the heat setting process.

As shown in FIG. 2, the platens have been moved toward each other to compress the fiberglass board. During the first phase of the heat setting process the platens are moved just in contact with the fiberglass board without applying a substantial amount of pressure. The heat from the platens begins to heat up the fibers in the glass fiber board. It is desirable to heat the glass fiber board prior to the application of substantial pressure by the platens so that the fibers are softened and relaxed and will not break upon the application of pressure. Preferably, the temperature of the board is raised to at least 260 degrees C. prior to the application of pressure by the platens. For purposes of this invention, all temperature measurements of the board are taken at the center of the board.

After several minutes of contact by the platens, the board has reached a temperature suitable for the application of pressure from the platens. The platens are then moved toward each other, as shown in FIG. 2, to compress the fibers in the glass fiber board. Typically, the preheating of the board prior to compression takes about 3 minutes and the stage in which the pressure is applied from the platens takes about 5 minutes.

When the pressure is applied initially, preferably to about 35 psi (242 kPa), the fiberglass board resists compression, and successfully opposes the pressure applied by the platens. Therefore, initially, the platens will not hit the stops. After a short time, the glass fibers become more fully relaxed, and the board becomes compressed, offering little resistance to the pressure applied by the platens. At some point, the platens reach the limit provided by the stops, and further compression of the board is precluded.

Figure 3:
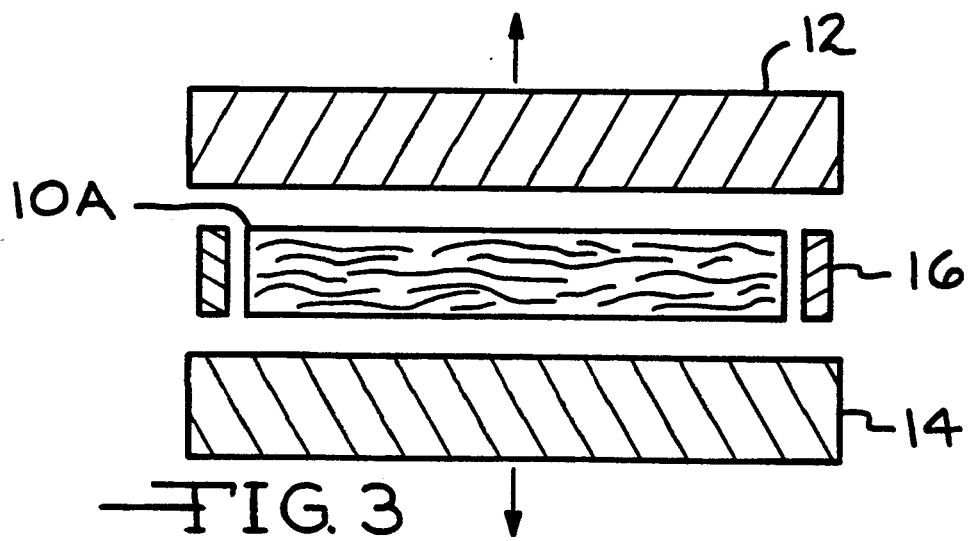
FIG. 3 is a schematic cross-sectional view in elevation of the heat treated board after the quick release of the board from the platens.

When the heat treatment process is concluded, the platens are quickly removed from the now heat treated board, 10A, as shown in FIG. 3. The board is released from the platens prior to substantial cooling of the board, which is defined as prior to cooling of glass fibers below the strain temperature of the glass. It is to be understood that the term quick release of the board from the platens also includes the possibility of heat setting the boards, according the principles of the invention, in a continuous process using an upper and lower traveling conveyer, not shown. In such a process, the quick release of the board from the platens amounts to having the board come out of the end of the conveyer system.

The heat setting process has been used on a glass fiber board of a typical boro-silicate wool glass. This glass has a strain temperature of 445 degrees C., an annealing temperature of 483 degrees C. and a softening point of 682 degrees C. In operation, the glass fiber board is typically heated to a temperature of 538 degrees C. prior to quick release of the board from the platens. It has been found that raising the temperature for this wool glass to a temperature substantially above 538 degrees C., for example to a temperature of 600 degrees C, will result in a heat treated board having a crusty, non-fibrous, fragile surface.

Figure 5:
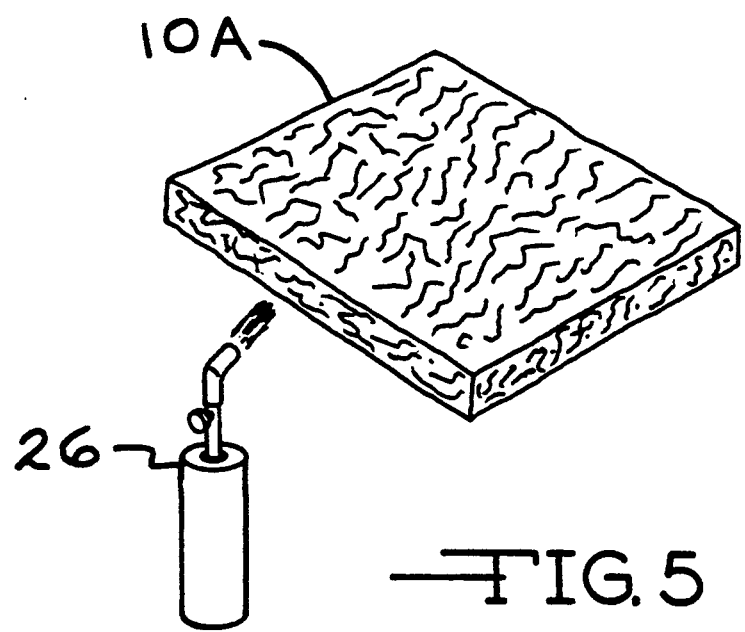
FIG. 5 is a perspective view of the heat treated board being treated with a flame prior to encapsulation.

As shown in FIG. 5, the edges of the heat treated board can be treated with a heating means, such as the flame of blow torch 26, to melt down or burn off any of the stray glass fibers on the edges of the board. The purpose of this is to eliminate the fibers which could cause defects at the joint of the envelope, thereby preventing a good vacuum in the finished product.

Figure 4:
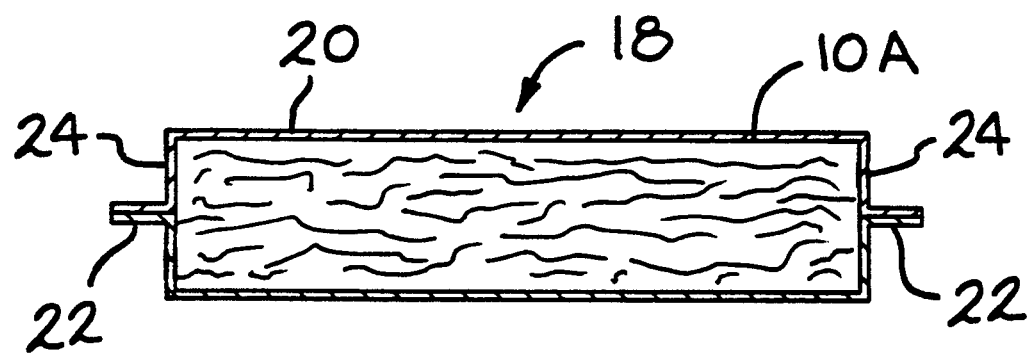
FIG. 4 is a schematic cross-sectional view in elevation of the insulation panel of the invention.

As shown in FIG. 4, the completed product, panel 18, is comprised of the heat treated board and envelope 20. Preferably, the envelope is produced in two halves, welded together at joints 22 around the edges 24 of the envelope.

The envelope is preferably made of a thin but strong material in order to provide strength and a good barrier to maintain the vacuum within the panel. The envelope is preferably made from a low conductance metal, which is one that has a combination of thinness and low thermal conductivity to prevent substantial conductance of heat. A suitable material is a stainless steel material having a thickness less than 7 mils (0.178 mm). Most preferably, the low conductance metal is Allegheny Ludlum type 201 stainless steel having a thickness of about 3 mils (0.076 mm). The area of the envelope having the most critical need for a low conductance material is at the edges of the envelope. This is because of the tendency of the heat to short-circuit the panel by flowing around the edges. It is possible to have the major faces of the envelope of one material or of one thickness of material and the edges of the envelope of a second material or second thickness of the material having a lower thermal conductivity.

After encapsulation, the panel can be evacuated, preferably to an absolute internal pressure of less than 20 torr, and most preferably to an absolute internal pressure within the range of from about $10^{-5}$ to about $10^{-1}$ torr. Numerous evacuation techniques are known in the art. Most preferably, the absolute internal pressure is about $10^{-3}$ torr. The joints at the edges of the envelope are preferably sealed by welding, The resulting panel exhibits a significant improvement over the prior art panels typically used in appliances such as refrigerators by providing a higher R-value. The heat treated board provides adequate structural strength to resist the pressure applied on the major surfaces of the board by the differential pressure between the partial vacuum and the outside atmospheric pressure.

A panel having a 21 in. square (53 cm×53 cm), ¾ inches thick (19 mm), heat-set board, when evacuated to $10^{-3}$ torr, and encapsulated by a stainless steel foil jacket (3 mil foil, 0.076 mm) has an R-value of 20, which is an equivalent value of 27 R per inch. This was measured using ASTM test C-518.

Various modifications may be made in the structure and methods shown and described without departing from the spirit and scope of the invention.

INDUSTRIAL APPLICABILITY

This invention will be useful for making insulation for appliances, transportation vehicles, and industrial equipment.

What is claimed is:

1. An insulation panel comprising a heat set insulation board of compressed glass fibers and a partially evacuated gas-tight envelope encapsulating the board, where, prior to the evacuation of the envelope, the board has been subjected to a heat setting process in which the glass fiber board is raised to a heat setting temperature above the strain temperature of the glass but below the softening temperature of the glass, and to a pressure applied by opposed platens within the range of from about 10 psi (69 kPa) to about 50 psi (345 kPa) followed by a quick release of the board from the platens prior to substantial cooling of the board.

2. The insulation panel of claim 1 in which the heat setting temperature is at least 20 degrees C. above the strain temperature of the glass.

3. The insulation panel of claim 1 in which the heat setting temperature is at least 80 degrees C. below the softening point of the glass.

4. The insulation panel of claim 1 in which the temperature of the board is raised to at least 260 degrees C. prior to application of pressure by the platens.

5. The insulation panel of claim 1 in which the edges of the board are treated with an additional application of heat prior to encapsulation.

6. An insulation panel comprising a heat set insulation board of compressed glass fibers and a partially evacuated gas-tight envelope encapsulating the board, where, prior to the evacuation of the envelope, the board has been subjected to a heat setting process in which the glass fiber board is raised to a heat setting temperature at least 20 degrees C. above the strain temperature of the glass but at least 80 degrees C. below the softening temperature of the glass, and to a pressure applied by opposed platens within the range of from about 10 psi (69 kPa) to about 50 psi (345 kPa) followed by a quick release of the board from the platens prior to substantial cooling of the board.

7. The insulation panel of claim 6 in which the temperature of the board is raised to at least 260 degrees C. prior to application of pressure by the platens.

8. The insulation panel of claim 6 in which the gas-tight envelope is comprised of a low conductance metal.

9. The insulation panel of claim 6 in which edges of the gas-tight envelope comprise a low conductance metal.

10. The insulation panel of claim 9 in which the low conductance metal has a thickness less than 7 mils (0.178 ram).

11. The insulation panel of claim 6 in which the gas-tight envelope has an absolute internal pressure of less than 20 torr.

12. The insulation panel of claim 11 in which the gas-tight envelope has an absolute internal pressure within the range of from about $10^{-5}$ to about $10^{-1}$ torr.

13. The insulation panel of claim 6 in which the density of the board is within the range of from about 6 pcf (96 kg/m³) to about 28 pcf (448 kg/m³).

14. The insulation panel of claim 13 in which the edges of the board are treated with an additional application of heat prior to encapsulation.

15. An insulation panel comprising a heat set insulation board of compressed glass fibers and a partially evacuated gas-tight envelope encapsulating the board, the gas-tight envelope having an absolute internal pressure within the range of from $10^{-5}$ to about $10^{-1}$ torr, where, prior to the evacuation of the envelope, the board has been subjected to a heat setting process in which the glass fiber board is raised to a heat setting temperature at least 20 degrees C. above the strain temperature of the glass but at least 80 degrees C. below the softening temperature of the glass, and to a pressure applied by opposed platens within the range of from about 10 psi (69 kPa) to about 50 psi (345 kPa) followed by a quick release of the board from the platens prior to substantial cooling of the board.

16. The insulation panel of claim 15 in which the edges of the gas-tight envelope comprise a low conductance metal.

17. The insulation panel of claim 15 in which the edges of the board are treated with an additional application of heat prior to encapsulation.

18. The insulation panel of claim 15 in which the heat-set board has the ability to withstand external pressure loading of at least 20 psig (138 kPa) without deflection greater than 15 percent.

* * * * *